US012772097B2

(12) United States Patent
Trincal et al.

(10) Patent No.: US 12,772,097 B2
(45) Date of Patent: Oct. 20, 2026

(54) METHOD FOR SMART AIR/GROUND DATA TRANSMISSION OPTIMIZATION

(71) Applicant: Rockwell Collins, Inc., Cedar Rapids, IA (US)

(72) Inventors: Frédéric Trincal, Toulouse (FR); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 608 days.

(21) Appl. No.: 18/112,016

(22) Filed: Feb. 21, 2023

(65) Prior Publication Data

US 2024/0284237 A1 Aug. 22, 2024

(51) Int. Cl.

| | |
|---|---|
| ***H04W 28/02*** | (2009.01) |
| ***B64D 43/00*** | (2006.01) |
| ***G01S 13/95*** | (2006.01) |
| ***H04W 24/08*** | (2009.01) |

(52) U.S. Cl.

CPC ........ *H04W 28/0236* (2013.01); *B64D 43/00* (2013.01); *G01S 13/953* (2013.01); *H04W 24/08* (2013.01)

(58) Field of Classification Search

CPC ... H04W 28/0236; H04W 24/08; H04W 4/42; B64D 43/00; G01S 13/953; G01S 7/003; G08G 5/21; G08G 5/25; G08G 5/26; G08G 5/76; Y02A 90/10; G01W 1/10

See application file for complete search history.

(56) References Cited

U.S. PATENT DOCUMENTS

| | | | | |
|---|---|---|---|---|
| 5,920,827 | A * | 7/1999 | Baer | G01W 1/06 702/3 |
| 6,014,606 | A | 1/2000 | Tu | |
| 7,307,583 | B1 | 12/2007 | Woodell et al. | |
| 7,352,317 | B1 | 4/2008 | Finley et al. | |
| 7,427,943 | B1 | 9/2008 | Kronfeld et al. | |
| 7,515,088 | B1 | 4/2009 | Woodell et al. | |

(Continued)

FOREIGN PATENT DOCUMENTS

| | | | |
|---|---|---|---|
| EP | 3048584 A1 * | 7/2016 | G06T 11/206 |

OTHER PUBLICATIONS

Yanovsky et al., "Automated Dependent Surveillance: Aircraft Position and Weather Data", IEEE, Proc. Enhanced Surveillance of Aircraft and Vehicles, TIWDC/ESAV, Capri, Italy, 2008, pp. 132-137 (Year: 2008).*

(Continued)

*Primary Examiner* — Shah M Rahman
(74) *Attorney, Agent, or Firm* — Suiter Swantz IP

(57) ABSTRACT

A system is described. The system connects an aircraft weather radar to a ground station. The ground station may include improved situational awareness regarding weather cells due to the connection to the aircraft weather radar. In particular, the situational awareness may be improved in areas not covered by ground weather radars. For example, the ground station may provide earlier rerouting to the aircraft around the weather cells. The aircraft may transmit data regarding the weather cells at an interval. The interval may be dynamically adjusted based on a number of factors to ensure adequate situational awareness while optimizing the resources of an air-to-ground communication link.

15 Claims, 5 Drawing Sheets

400

(56) References Cited

U.S. PATENT DOCUMENTS

| | | | | |
|---|---|---|---|---|
| 7,633,428 | B1 | 12/2009 | McCusker et al. | |
| 7,633,431 | B1 | 12/2009 | Wey et al. | |
| 8,314,730 | B1 | 11/2012 | Musiak et al. | |
| 8,344,933 | B1 | 1/2013 | Kronfeld et al. | |
| 8,994,578 | B1 | 3/2015 | Finley et al. | |
| 9,411,044 | B1 | 8/2016 | Sperling et al. | |
| 9,535,158 | B1 | 1/2017 | Breiholz et al. | |
| 9,607,523 | B2 | 3/2017 | Wang | |
| 9,689,984 | B1 | 6/2017 | Breiholz et al. | |
| 9,691,288 | B2 | 6/2017 | Agrawal | |
| 9,810,770 | B1 | 11/2017 | Weichbrod et al. | |
| 9,869,766 | B1 | 1/2018 | Breiholz et al. | |
| 10,151,834 | B2 | 12/2018 | Wang et al. | |
| 10,175,353 | B2 | 1/2019 | Kronfeld et al. | |
| 10,215,840 | B2 | 2/2019 | Wang | |
| 10,222,452 | B2 | 3/2019 | Bisti et al. | |
| 10,388,169 | B2 | 8/2019 | Agrawal | |
| 10,605,912 | B1 | 3/2020 | Godfrey et al. | |
| 10,868,612 | B2 | 12/2020 | Mohideen et al. | |
| 2004/0246145 | A1 | 12/2004 | Andrews et al. | |
| 2006/0069497 | A1 | 3/2006 | Wilson | |
| 2013/0009808 | A1 | 1/2013 | Hering et al. | |
| 2014/0358441 | A1 | 12/2014 | Hale et al. | |
| 2014/0377734 | A1* | 12/2014 | Crowhurst | G09B 5/14<br>434/350 |
| 2015/0304813 | A1 | 10/2015 | Esposito et al. | |
| 2016/0019796 | A1 | 1/2016 | Agrawal | |
| 2016/0019798 | A1 | 1/2016 | Agrawal | |
| 2016/0211898 | A1* | 7/2016 | Cai | H04B 7/0617 |
| 2016/0266249 | A1* | 9/2016 | Kauffman | G08G 5/22 |
| 2017/0046962 | A1* | 2/2017 | Shipley | G08G 5/30 |
| 2018/0038414 | A1* | 2/2018 | Sasao | G01M 13/04 |
| 2018/0047294 | A1* | 2/2018 | Esposito | G08G 5/21 |
| 2018/0287692 | A1* | 10/2018 | Matyas | H04B 7/18506 |
| 2019/0213892 | A1* | 7/2019 | Schwindt | B64D 45/00 |
| 2019/0311631 | A1 | 10/2019 | Holmes | |
| 2019/0324439 | A1* | 10/2019 | Cella | G06N 3/042 |
| 2021/0383708 | A1* | 12/2021 | Gibbons, II | G08G 5/53 |
| 2022/0139235 | A1 | 5/2022 | Teague | |
| 2023/0129613 | A1* | 4/2023 | Kauffman | G01S 13/953<br>701/10 |
| 2024/0161631 | A1* | 5/2024 | Duraisamy | G08G 5/22 |
| 2025/0300716 | A1* | 9/2025 | Yano | H04L 1/0003 |

OTHER PUBLICATIONS

Darl Kuhn, "ADS-B Assisted Weather Information Sensing and Downloading ED" ip.com, ip.com Inc., West Henrietta, NY Jul. 12, 2017.

Extended European Search Report dated Apr. 29, 2024; European Application No. 23211576.6.

European Patent Office, Examination Report received in EP Application No. 23211576.6, Sep. 8, 2025, 8 pages.

* cited by examiner

METHOD FOR SMART AIR/GROUND DATA TRANSMISSION OPTIMIZATION

TECHNICAL FIELD

The present invention generally relates to weather radar data, and more particularly to transmitting the weather radar data from an aircraft.

BACKGROUND

Aircraft may be used to automatically scan areas where there are gaps in the ground weather radar detection networks. In addition, aircraft may be used to scan areas of the atmosphere that have the potential for severe weather. Scanning these areas may improve the radar scan updates for severe storms and potentially improve forecasting of the severe weather as well as shorten the forecast cycle. Improving forecasting of severe weather and shortening the forecast cycle may benefit aviation as well as ground-based operations.

One obstacle to sharing the weather data is the expensive costs associated with transmitting data via HF, VHF, or satellite communications. Another obstacle is the available data channel capacity or bandwidth. Therefore, it would be advantageous to provide a device, system, and method that addresses the shortcomings described above.

SUMMARY

A system is described, in accordance with one or more embodiments of the present disclosure. In some embodiments, the system includes a memory maintaining program instructions. In some embodiments, the system includes one or more processors configured to execute the program instructions. In some embodiments, the program instructions cause the one or more processors to receive weather data from a weather radar system onboard an aircraft. In some embodiments, the weather data is associated with a plurality of radar returns. In some embodiments, the program instructions cause the one or more processors to cause a communication system to wirelessly transmit the weather data at a first interval from the aircraft. In some embodiments, the program instructions cause the one or more processors to cause the communication system to increase the wireless transmission of the weather data from the first interval to a second interval. In some embodiments, the second interval is faster than the first interval.

An aircraft is described, in accordance with one or more embodiments of the present disclosure. In some embodiments, the aircraft includes a radar system configured to generate weather data at a sampling rate. In some embodiments, the weather data is associated with a plurality of radar returns. In some embodiments, the aircraft includes a flight display configured to generate a weather radar overlay based on the weather data. In some embodiments, the aircraft includes a communication system configured to wirelessly transmit the weather data from the aircraft. In some embodiments, the aircraft includes a memory maintaining program instructions. In some embodiments, the aircraft includes one or more processors configured to execute the program instructions. In some embodiments, the program instructions cause the one or more processors to receive the weather data from the weather radar system. In some embodiments, the program instructions cause the one or more processors to cause the communication system to wirelessly transmit the weather data at a first interval from the aircraft. In some embodiments, the program instructions cause the one or more processors to cause the communication system to increase the wireless transmission of the weather data from the first interval to a second interval; wherein the second interval is faster than the first interval.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
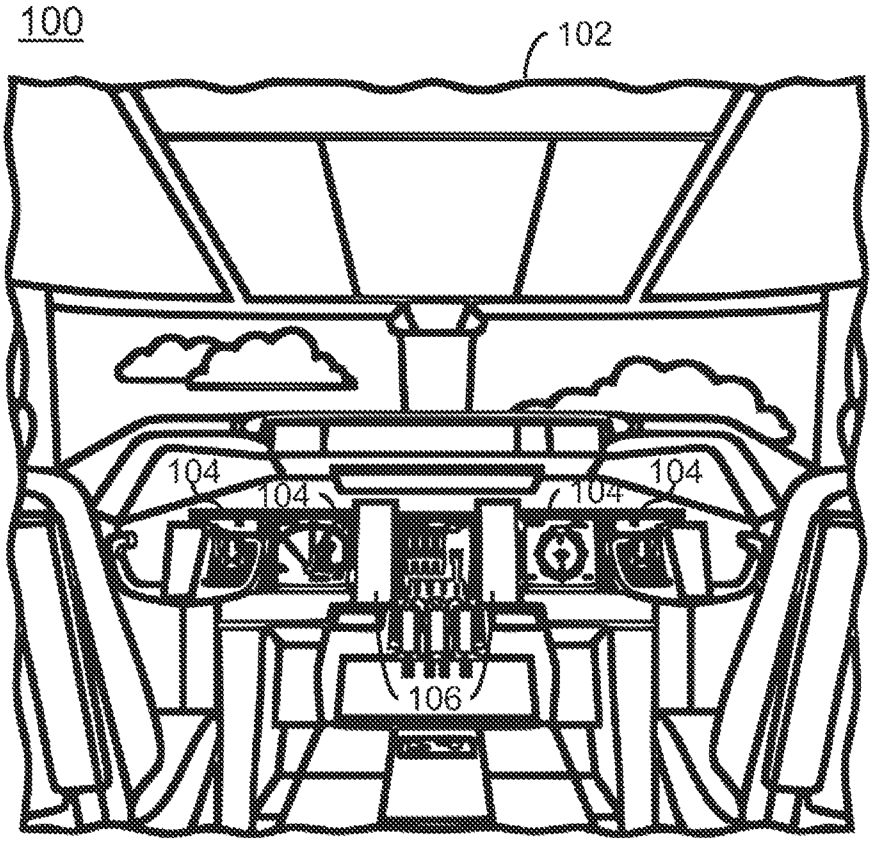
FIG. 1A depicts an aircraft cockpit, in accordance with one or more embodiments of the present disclosure.

Before explaining one or more embodiments of the disclosure in detail, it is to be understood that the embodiments are not limited in their application to the details of construction and the arrangement of the components or steps or methodologies set forth description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a"

and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are directed to connecting a ground station with weather data from a weather radar system on an aircraft. The aircraft may be equipped with the weather radar system. The weather radar system may capture real-time weather data. The real-time weather data captured by the radar may be transmitted to the ground station by a communication system. The communication system may transmit the weather data at an interval. The interval may be dynamically updated when the aircraft is in a turn and based on a wireless transmission characteristic, such as an available bandwidth. The ground station may then use the real-time weather data for one or more purposes, such as for flight trajectory changes to accommodate for weather.

U.S. Pat. No. 10,175,353, titled "Enhancement of airborne weather radar performance using external weather data", and filed on Sep. 23, 2015; U.S. Pat. No. 7,352,317, titled "Data compression system and method for a weather radar system", and filed on Jun. 23, 2005; U.S. Pat. No. 8,994,578, titled "Adjusting a target value for generating a vertical profile view in a weather radar system", and filed on Sep. 27, 2011; U.S. Pat. No. 9,411,044, titled "Auto updating of weather cell displays", and filed on Feb. 27, 2013; U.S. Pat. No. 8,344,933, titled "System and method for aircraft communications", and filed on Sep. 30, 2010; U.S. Pat. No. 9,810,770, titled "Efficient retrieval of aviation data and weather over low bandwidth links", and filed on Jul. 3, 2014; U.S. Pat. No. 9,535,158, titled "Weather radar system and method with fusion of multiple weather information sources", and filed on Aug. 21, 2014; are each incorporated herein by reference in the entirety.

Referring to FIG. 1A, a schematic illustration of an aircraft control center or cockpit 102 is shown according to an exemplary embodiment of the inventive concepts disclosed herein. The cockpit 102 may include one or more flight displays 104 and one or more user interface ("UI") elements 106.

In embodiments, the flight displays 104 may provide an output from an onboard aircraft-based weather radar system, LIDAR system, infrared system or other system on an aircraft. For example, the flight displays 104 may include a weather display, a weather radar map, and a terrain display. In embodiments, the flight displays 104 may provide an output based on a combination of data received from multiple external systems or from at least one external system and an onboard aircraft-based system. The flight displays 104 may include an electronic display or a synthetic vision system (SVS). For example, the flight displays 104 may include a display configured to display a two-dimensional (2-D) image, a three-dimensional (3-D) perspective image of terrain and/or weather information, or a three-dimensional (3-D) display of weather information or forecast information combined with forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

In embodiments, the display 104 is a color display that receives an ARINC 708 data stream. According to the ARINC 708 standard, each pixel is represented by 3 bits of color data allowing 8 total data values per pixel. The bit count may be increased to increase the number of available colors. The data is typically generated as a sequence of radials emanating from the aircraft location and spanning 180 degrees of azimuth. Generally, 512 points are generated along each radial and the radials are generated each 0.25 degrees. Thus, for a 180-degree scan, 368640 data points are generated (512*(180/0.25)). Other display interfaced standards such as ARINC 661 or any other protocol including raster protocols may also be used.

Figure 1B:
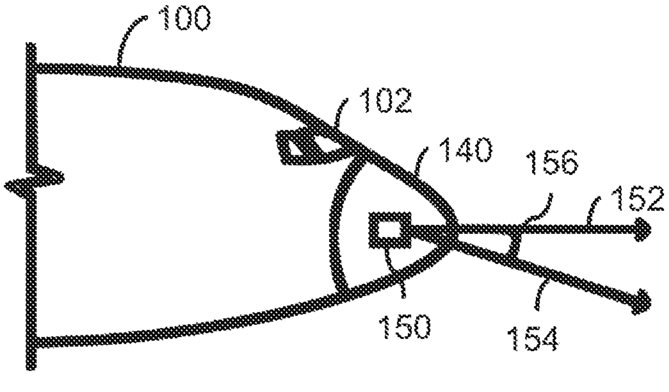
FIG. 1B depicts simplified view of a front of an aircraft including a weather radar system, in accordance with one or more embodiments of the present disclosure.

Referring to FIG. 1B, a schematic illustration of the front of an aircraft 100 is shown according to an exemplary embodiment of the inventive concepts disclosed herein. The aircraft 100 includes a nose 140, a weather radar system 150, and the aircraft control center or cockpit 102.

The weather radar system 150 may also be referred to as a weather radar, on-board weather radar, and the like. The weather radar system 150 is generally located inside the nose 140 of the aircraft 100 or inside the cockpit 102 of the aircraft 100. According to other exemplary embodiments of the inventive concepts disclosed herein, the weather radar system 150 may be located anywhere on the aircraft 100, such as on the top of the aircraft 100, on the belly of the aircraft 100, on the tail of the aircraft 100, or on either or both sides of the aircraft 100. Various components of the weather radar system 150 may be distributed at multiple locations throughout the aircraft 100. The weather radar system 150 may include or be coupled to an antenna system of the aircraft 100. The weather radar system 150 or other equipment onboard the aircraft 100 may be configured to receive weather data from other sources. For example, the weather radar system 150 or other equipment aboard the aircraft 100 may receive weather data from ground-based weather radar systems, satellite-based systems, and from aircraft-based system of other aircraft. The weather radar system 150 may be any weather radar system configured to detect or receive data for the systems and methods of the present disclosure. According to exemplary embodiments of the inventive concepts disclosed herein, the weather radar system 150 may be a MultiScan™ weather radar system, or similar system.

The weather radar system 150 may be configured to cast one or more radar signals from an aircraft mounted antenna, to receive returns, receive echoes, and/or receive radio frequency (RF) signals. The weather radar system 150 may also be configured to interpret the received echoes (e.g., for display to a user by the flight displays 104, for transmission to an external weather display system, for transmission to an external weather data storage system, and the like).

The weather radar system 150 may generally operate by sweeping a radar beam horizontally back and forth. For example, the weather radar system 150 may conduct a first horizontal sweep 152 directly in front of the aircraft 100 and a second horizontal sweep 154 downward at a tilt angle 156 (e.g., 20 degrees downward). Received echoes from different tilt angles may be electronically merged to form a composite image for display on an electronic display, such as the flight displays 104 in the cockpit 102. Received echoes may also be processed to, for example, distinguish among terrain, weather, and other objects, to determine the height of the terrain, and to determine the height of the weather.

The weather radar system 150 may also sweep a radar beam vertically back and forth across the sky. In embodiments, the weather radar system 150 may sweep a radar beam vertically back and forth at varying vertical tilt angles. Results from the different vertical tilt angles may be analyzed to determine the characteristics of weather. For example, the altitude, range, and vertical height of weather conditions may be determined using the vertical scan results. The vertical scan results may be used to form an image for display on an electronic display. For example, a vertical profile view of the weather may be generated and provided to flight crew on the flight display 104 of the cockpit 102. The profile may be used by a flight crew to determine height, range, hazards and threats, and other relevant information that may be utilized by an aircraft crew member to evaluate a current course or to change the course of the aircraft to avoid the detected weather condition. The profile may also be used by an autonomous system which determines the height, range, hazards and threats, and other relevant information. The autonomous system may include one or more functions, such as, but not limited to, image processing to determine the height, range, hazards and threats, and other relevant information. The image processing may include an image processing model trained using machine learning or a similar approach.

In embodiments, the weather radar system 150 may generate weather data (e.g., weather data 302) associated with the received radar returns. In embodiments, the flight display 104 may generate a graphical overlay based on the weather data from the weather radar system 150.

Figure 2A:
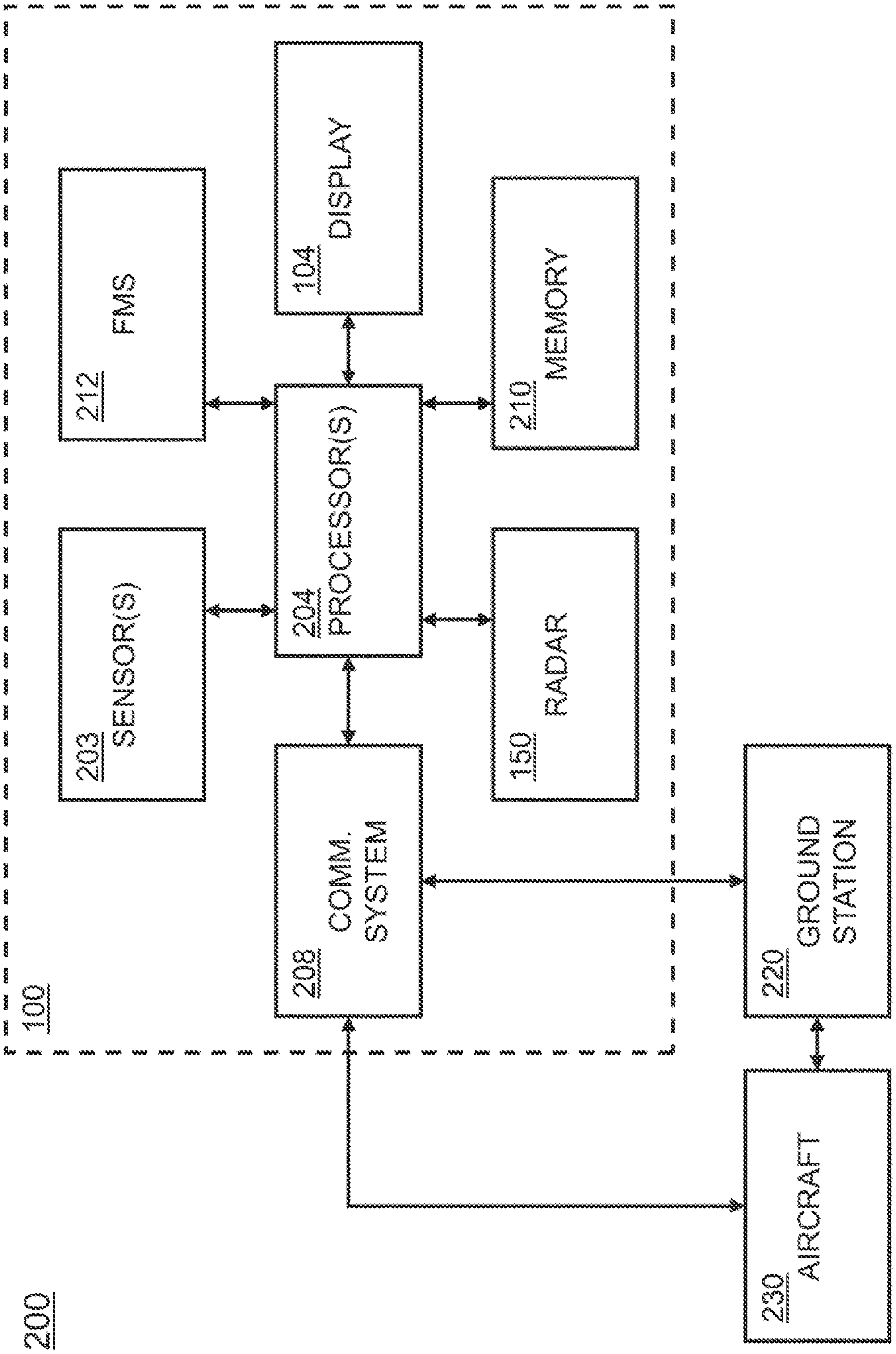
FIGS. 2A-2B depict a simplified block diagram of a system, in accordance with one or more embodiments of the present disclosure.
Figure 2B:
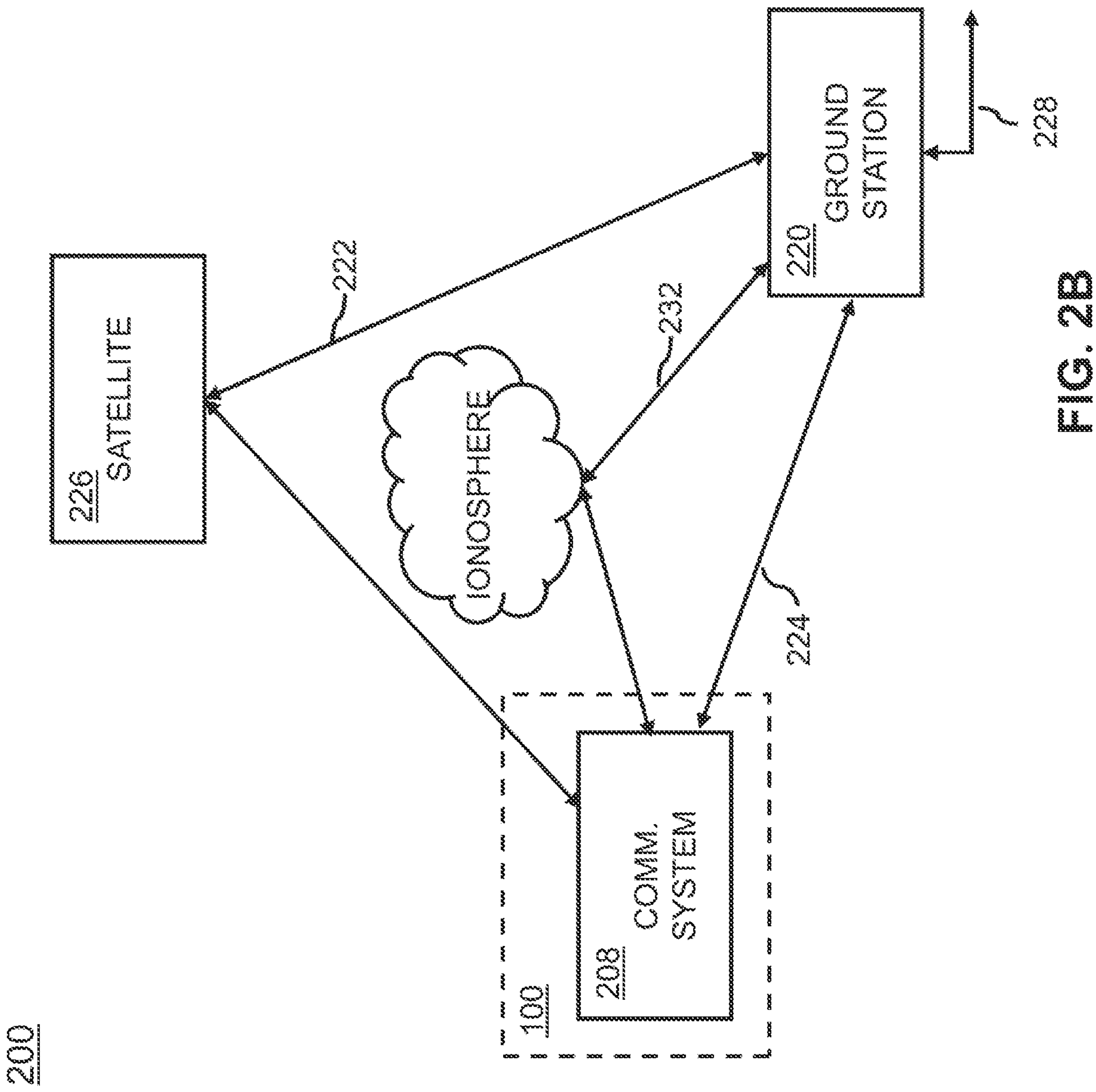

Referring to FIGS. 2A-2B, a block diagram of a system 200 is shown according to an exemplary embodiment of the inventive concepts disclosed herein. The system 200 includes the aircraft 100, a ground station 220, one or more other aircraft 230, a satellite 226, and the like. As depicted, the aircraft 100 may include the flight displays 104, the weather radar system 150, aircraft sensors 203, processors 204, a communication system 208, a flight management system 212, and the like.

The aircraft sensors 203 may include, for example, one or more airspeed sensors, location tracking sensors (e.g., GPS, ADS-B, and the like), lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, fuel sensors, or any other aircraft sensors or sensing systems that may be used to monitor the performance of an aircraft or weather local to or remote from the aircraft. Data from the aircraft sensors 203 may be output to the processors 204 for further processing and display, for input to the weather radar system 150, or for transmission to a station (e.g., a ground-based weather radar system or terrestrial station such as the terrestrial station 220, air traffic control services system, or other terrestrial station), satellite 226, or to the aircraft 230 via the communication system 208. Data collected from external systems (e.g., the terrestrial station 220) may also be processed by the processors 204 to configure the collected data for display and to provide the data to the weather radar system 150 to be processed and used to control aspects of the weather radar system 150.

The weather radar system 150 may be a system for detecting weather patterns. Detected weather patterns may be communicated to the flight display 104 for display to the flight crew. Detected weather patterns may be provided to the processors 204 for further processing and analysis, for use in automated functions, or for transmission to an external system (e.g., the terrestrial station 220, a satellite system, the other aircraft 230) via the communication system 208. In embodiments, the weather radar system 150 may generate weather data (e.g., weather data 302). The processors 204 may receive the weather data from the weather radar system 150.

In embodiments, the weather radar system 150 may include a sampling rate. The weather radar system 150 may generate a set of weather data at a sampling rate. The weather radar system may include a sampling rate of 4 seconds per set of weather data, although this is not intended to be limiting.

The communication system 208 may include one or more of radio systems. The radio systems may communicate using one or more frequency bands. The radio systems may be configured for line-of-sight communications, beyond-line-of-sight communications, satellite communications, and the like. The radio systems may include, but are not limited to, a high-frequency (HF) radio system, a very-high frequency (VHF) radio system, an ultra-high frequency (UHF) radio system, an L-Band radio system, an S-band radio system, a C-band radio system, an X-band radio system, a Ku-band radio system, a K-band radio system, a Ka-band radio system, a satellite communication (SATCOM) radio system, and the like. The communication system 208 may be configured to communicate with external systems, such as the ground station 220, satellite 226, and/or the aircraft 230. For example, the radio systems may establish a wireless communication link with the ground station 220, as will be described further herein.

In embodiments, the flight management system 212 (FMS) may perform functions to manage the flight of the aircraft 100. The flight management system 212 may receive and/or store a flight plan of the aircraft 100. The flight management system 212 may also maintain one or more navigation databases. The flight management system 212 may determine the position of the aircraft 100. For example, the flight management system 212 may determine the position of the aircraft 100 based on various information from the sensors 203. The flight management system 212 may also determine a course to follow, the course ensuring the aircraft 100 follows the flight plan. The flight management system 212 may also cause an autopilot to control the aircraft 100 to maintain the position along the flight plan. The position of the aircraft 100 and/or the course determined by the flight management system 212 may be provided to the processors 204. The processors 204 may use the position and the course for determining expected trajectory changes, as will be described further herein.

In embodiments, the processors 204 may convert the weather data into a format suitable for transmission to the ground station 220 from the communication system 208. The processors 204 cause the communication system 208 to transmit the weather data to the ground station 220 and/or the aircraft 230 over the air-to-ground communication channel using a transport layer protocol. The transport layer protocol may include, but is not limited to, User Datagram Protocol (UDP), Transmission Control Protocol (TCP), Stream Control Transmission Protocol (SCTP)), and the like.

In embodiments, the processors 204 may perform data compression on the weather data. The processors 204 may use any form of data compression. In embodiments, the processors 204 may use an algorithm to perform the compression. The compression algorithm may include a lossless compression algorithm or a lossy compression algorithm. For example, the lossless compression algorithm may generate a ZIP file with the weather data, although this is not intended as a limitation of the present disclosure.

In embodiments, the processors 204 may use single or multiple radar sweep compression. The processors 204 may aggregate multiple sets of the weather data from the weather radar system 150. The processors 204 may then compress the multiple sets of weather data for transmission to the ground station 220. For example, the weather radar system 150 may generate a new set of weather data every four seconds. The processors 204 may aggregate each of the sets of weather data and compress the sets of weather data for transmission at a rate less than the sampling rate of the weather radar system 150.

Referring to FIG. 2B, the aircraft 100 may communicate with the ground station 220 using an air-to-ground communication channel. Various types of channels may be utilized including virtual channels, radio channels, satellite channels, and the like. The channels may be bidirectional or unidirectional. Channels may be satellite link channels, VHF channels, HF channels, and the like. Any type of wireless communications may be utilized. Various types of communication protocols, including network and ad hoc network protocols may be used to perform communication operations and establish the channels.

In embodiments, the weather data may be transmitted to the terrestrial station 220 and/or the aircraft 230 from the communication system 208 via an air-to-ground communication channel. The weather data collected from the weather radar system 150 can then be downlinked to the ground station 220 or to the other aircraft 230. The processors 204 may cause the communication system 208 to wirelessly transmit the weather data from the aircraft 100 to an external location, such as the ground station 220 or to the other aircraft 230. The air-to-ground communication channel may include a wireless link such as, but not limited to, a satellite communication (SATCOM) link 222, a very-high frequency (VHF) link 224, a high-frequency (HF) link 232, and the like.

In embodiments, the system 200 may include the satellite 226. The communication system 208 of the aircraft 100 may uplink the weather data to the satellite 226 by the SATCOM link 222. The satellite 226 may then downlink the weather data to the ground station 220 (e.g., to a communication system of the ground station 220). The satellite 226 may be part of any number of satellite constellations, such as, but not limited to, Inmarsat, Iridium (e.g., Iridium NEXT), ViaSat, and the like.

In embodiments, the communication system 208 of the aircraft 100 may communicate the weather data to the ground station 220 (e.g., to a communication system of the ground station 220) by the VHF link 224. The VHF link 224 may also be considered a line-of-sight link.

In embodiments, the communication system 208 of the aircraft 100 may communicate the weather data to the ground station 220 via the HF link 232. The HF link 232 may be considered a beyond-line of sight link which may reflect from the ionosphere.

The ground station 220 may also receive the weather data from the aircraft 100 via a wired link 228 (e.g., from one or more ground based communication systems). The wired link 228 may be an intermediate link between the ground station 220 and the air-to-ground communication from the aircraft 100.

Figure 3:
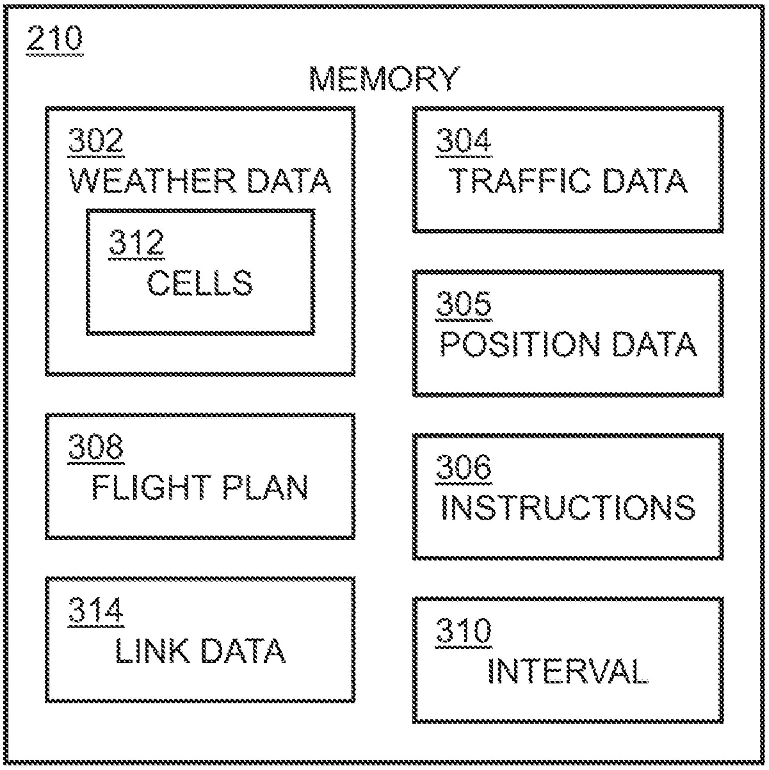
FIG. 3 depicts a simplified block diagram of a memory, in accordance with one or more embodiments of the present disclosure.

Referring now to FIGS. 3, the memory 210 is described, in accordance with one or more embodiments of the present disclosure. The memory 210 may include weather data 302, traffic data 304, program instructions 306, flight plans 308, intervals 310, link data 314, and the like.

In embodiments, the weather data 302 includes a reflectivity value for range bins. In embodiments, the weather data 302 includes a range setting, a gain setting, a scan angle setting, and/or a tilt setting for the weather radar system 150. The weather data 302 may also be indicative of one or more types of weather conditions. For example, the weather data 302 may be indicative of weather cells, convective weather systems (e.g., thunderstorms), turbulence, winds aloft, icing, hail, or volcanic ash. The weather data 302 may be processed to generate graphical overlays for the flight display 104.

In embodiments, the weather data 302 may include data maintained in an ARINC 708A data format, although this is not intended to be limiting. The weather data 302 may include rho-theta data, raster data, graphical data, compressed data, non-compressed data, and the like.

The weather data 302 may include weather cell data 312 associated with one or more weather cells. The weather cell data 312 may include identifications (IDs) for the weather cells. The weather cell data 312 may be provided as, for example, textual information, a table of alphanumeric values, and/or as a stand-alone display or graphical overlay. The program instructions 306 cause the processors 204 to detect and track the weather cells in the weather data 302. The weather cells may be tracked as the weather cell data 312. The weather cell data 312 may be generated by monitoring movement of weather cells and matching cells in current and prior volume scans. The weather cell data 312 may then adapt with changes in the weather cells.

The weather cell data 312 may be, for example, 3-D regions of significant reflectivity or other values above one or more specified threshold values. The weather cell data 312 may be composed of reflectivity radial run segments, and in turn, 2-D weather components composed of segment groups and occurring at different radar elevation angles. The weather cell data 312 may also include individual data points and trends for each weather cell. For example, the weather cell data 312 may include current weather cell location. The current weather cell location may be provided with azimuth, range, direction, and speed information, such as a motion vector using polar and/or Cartesian coordinates along with an estimate of any tracking errors. The weather cell data 312 may also include, for example, storm base height, storm top height, maximum reflectivity, centroid latitude, centroid longitude, centroid height, height of maximum reflectivity, a weather condition (e.g., probability of hail, probability of lightning, and the like), cell-based vertically integrated liquid (VIL) content, enhanced echo tops (EET), convective activity and/or cell growth rate, among other information types.

The weather cell data 312 may include forecast data. The forecast data may be generated by predicting future centroid locations based on prior volume scans, and growth, decay, and/or shape change estimates. The weather data 302 may also include average data for multiple weather cells (e.g., average motion vector data).

The weather cell data 312 may include range data and bearing data. The range data and bearing data may represent an approximate range and bearing, respectively, from the current position of the aircraft 100 to the respective weather cell. In embodiments, the range and bearing data may be dynamically updated to account for movement of the aircraft 100 and/or the weather cell. The range data may also be referred to as distance data.

In embodiments, the memory 210 may include traffic data 304 and/or position data 305. The aircraft sensors 203 may generate the traffic data 304 and/or the position data 305. The processors 204 may receive the traffic data 304 and/or the position data 305 from the aircraft sensors 203 and store the traffic data 304 and/or the position data 305 in the memory 210. In embodiments, the position data 305 may be received from the flight management system 212. The traffic data 304 and/or the position data 305 may be used by the aircraft 100 for various purposes. The traffic data 304 and/or the position data 305 may also be provided to the processors 204 for further processing and analysis, for use in automated functions, or for transmission to an external system (e.g., the terrestrial station 220, a satellite system, the other aircraft 230) via the communication system 208.

The traffic data 304 may be in any suitable format, such as, but not limited to, Automatic Dependent Surveillance Broadcast (ADS-B) data, Aircraft Situation Display to Industry (ASDI), and the like.

The position data 305 may be in any suitable format, such as, but not limited to, global navigation satellite system (GNSS) (e.g., global positioning system (GPS)), Distance Measuring Equipment (DME), very-high frequency (VHF) Omnidirectional Radio Range (VOR), Inertial Reference System (IRS), Vertical Navigation (VNAV), dead reckoning data, data related to aircraft position, data related to flight path, flight path management data, registration data, and the like. The position data 305 may include, but is not limited to, airborne position, airborne velocity, airspeed, longitude, latitude, altitude, heading, pitch, and the like.

In embodiments, the memory 210 may include the flight plan 308. The flight plan 308 may indicate a planned path of the aircraft 100. The flight plan 308 may include various data such as, but not limited to, waypoints, airways, airports, runways, lateral paths, vertical paths, speed requirements, and the like. The flight plan 308 may be managed in-flight by a flight management system (FMS) of the aircraft 100.

In embodiments, the memory 210 may include the program instructions 306. The program instructions 306 may be executable by the processors 204. The program instructions 306 may implement any of the various steps or methods described herein. For example, the program instructions 306 may implement a method for smart air-to-ground data transmission optimization.

In embodiments, the memory 210 may include an interval 310. The interval 310 may refer to an interval at which the air-to-ground communication channel is used to wirelessly transmit the weather data 302 from the aircraft 100 to the ground station 220 and/or the aircraft 230. The program instructions 306 may cause the processors 204 to cause the communication system 208 to wirelessly transmit the weather data 302 at the interval 310 from the aircraft 100 to an external location (e.g., via the air-to-ground communication link).

In embodiments, the interval 310 may be based on the interval in which the weather display 104 may generate a weather radar overlay based on the weather data 302. For example, the weather display 104 may generate a weather radar overlay based on weather data. The weather radar overlay may include multiple radials, such as, but not limited to, 720 of the range bins. Each of the range bins may be generated at frequency, such as, but not limited to, 180 hertz. For this example, new images may be generated every 4 seconds. The interval 310 at which the weather data 302 is transmitted may be based on the time to generate the image. In this example, the interval 310 is every 4 seconds, although this is not intended to be limiting. Transmitting the weather data 302 every four seconds would then provide the ground station 220 with real-time information from the aircraft 100. However, transmitting the weather data 302 in real-time may include sending a significant amount of data over the air-to-ground communication channel. The volume of data to be sent to the ground can be significant as a complete set of the weather data 302 is produced every 4 seconds by the weather radar system 150. The volume of data may outpace the capability of one or more communication links, such as the SATCOM link 222.

In embodiments, the interval 310 may be a dynamic interval. The dynamic interval may indicate that the transmission interval of communication system 208 for the weather data 302 may be changed. Changing the interval 310 may be advantageous to conserve resources over the air-to-ground link while providing adequate situational awareness regarding the weather cells to the ground station 220. Conserving the communication system 208 transmitting the weather data 302 may reduce a communication cost.

The program instructions 306 may cause the processors 204 to cause the communication system to change the wireless transmission of the weather data between one or more intervals. The intervals may be changed from a first interval to a second interval, and vice-versa. For example, the transmission may be increased from the first interval to the second interval, where the second interval is faster than the first interval. By way of another example, the transmission may be decreased from the second interval to the first interval, where the second interval is faster than the first interval. Thus, the interval 310 may be increased or decreased.

In embodiments, the interval 310 may be changed to be as fast as and/or slower than the real-time interval (e.g., every four seconds). For instance, the interval 310 may be every four seconds, every thirty seconds, every minute, every ten minutes, an interval therebetween, or a greater interval. In this regard, the specific length of the interval is not intended to be limiting.

The processors 204 may dynamically change the interval 310 based on one or more factors. The factors may include, but are not limited to, motion of the aircraft 100, characteristics of the weather cell data 312, link data 314 regarding the air-to-ground links (e.g., satellite communication (SATCOM) link 222, a very-high frequency (VHF) link 224, a high-frequency (HF) link 232), and the like.

In embodiments, the interval 310 may be changed based on motion of the aircraft 100. The motion of the aircraft 100 may cause a field-of-view of the weather radar system 150 to change. The motion of the aircraft may be determined by the processors 204 based on the traffic data 304 and/or position data 305 (e.g., GPS data, compass data, throttle information, velocity information, and the like). The position data 305 may be indirectly or directly indicative of the speed and direction of the aircraft 100. For example, the processors 204 may directly receive speed and direction data from avionics equipment. In another example, the processors 204 may determine the speed and direction of the aircraft by comparing GPS locations. The program instructions 306 may cause the processors 204 to change the transmission interval of the weather data 302 in response to the processors 204 detecting an actual and/or expected change of a yaw and/or a pitch of the aircraft. The transmission may be changed from a first interval to a second interval which is faster than the first interval. An example is now described. The weather data 302 may be sent at a regular interval when the aircraft 100 is flying a straight line. The aircraft 100 may then make a turn or transition to a new altitude. When the aircraft 100 is making the turn or transitioning altitude, the weather radar system 150 may cover new airspace area. The interval may be changed to transmit the new weather data more quickly when the aircraft 100 is making the turn or transitioning altitude. More sets of weather data will be transferred to the ground station 220 to improve the situational awareness of the new airspace area. Changing the interval when the aircraft 100 is making the turn or transitioning altitude may ensure the weather data regarding the new airspace is transmitted.

In embodiments, an actual change in yaw and/or pitch of the aircraft 100 may be detected. The interval 310 may be adjusted in response to detecting the actual change in yaw and/or pitch of the aircraft 100. For example, the program instructions 306 may cause the processors 204 to detect the actual change in yaw and/or pitch. The actual change in yaw and/or pitch of the aircraft 100 may be detected based on the position data 305. For example, the position data 305 may indicate a lateral and/or vertical trajectory radius of the aircraft 100. The processors 204 may detect the trajectory change based on the position data 305. The processors may then determine if the aircraft is on a straight path, yawing, or pitching. In this regard, the processors 204 may be considered to detect changes in the path of the aircraft 100.

In embodiments, an expected change in yaw and/or pitch of the aircraft 100 may be detected. The interval 310 may be adjusted in response to detecting the expected change in yaw and/or pitch of the aircraft 100. For example, the program instructions 306 may cause the processors 204 to detect the expected change yaw and/or pitch. The expected change in yaw and/or pitch of the aircraft 100 may be detected based on the flight plan 308 and/or the position data 305. The processors 204 may know the aircraft 100 is supposed to yaw or pitch at one or more positions based on the flight plan 308. The processors 204 may compare a current position of the aircraft 100 (e.g., from the position data 305) with the flight plan 308 of the aircraft 100 to detect the expected change in the yaw and/or pitch. The expected change in yaw and/or the expected change in pitch may be recalculated as the position of the aircraft 100 and/or the flight plan 308 is updated in-flight. In this regard, the processors 204 may be considered to anticipate changings in the path of the aircraft 100.

The weather cell and the weather cell data 312 associated with the weather cell may change. The previous weather cell data transmitted to the ground station 220 may expire or become outdated regarding the current conditions of the weather cell. In embodiments, the interval 310 may be changed based on characteristics of the weather cell data 312. Changing the interval 310 based on characteristics of the weather cell data 312 may ensure the ground station 220 receives relevant weather cell data. The characteristics may include motion of the weather cell, a distance to the weather cell, intensity of the weather cell, detecting new weather cells, and the like.

In embodiments, the interval 310 may be changed based on the motion of the weather cells. For example, the processors 204 may track the centroid and/or outline of the weather cells in the weather cell data 312. The processors 204 may maintain a history of the weather cells and compare the data over time to determine the speed, direction, and range of the weather cells. In embodiments, the processors 204 may identify and track a centroid of the weather cells. In embodiments, the processors 204 may track the outlines of detected weather. In embodiments, the processors may track a maximum and/or a minimum height of detected weather. The interval 310 may then be changed in response to detecting a change in position of the centroid and/or outline of the weather cell in the weather cell data 312.

In embodiments, the interval 310 may be changed in response to the processors 204 detecting a change in a distance from the aircraft 100 to the one or more weather cells. The change in distance may be detected based on the range data. For example, the interval may be increased when the range data, indicating the distance between the aircraft 100 and the weather cell, falls below one or more thresholds. The communication system 208 may then transmit the weather data 302 more frequently when the aircraft 100 is in proximity to weather cells. Thus, the weather data 302 may be transmitted at an interval based on the proximity to the weather cells. One example is now described. The aircraft 100 may fly over the ocean with weather cells located hundreds of nautical miles ahead of the aircraft. The interval 310 may be heavily reduced to conserve bandwidth over the air-to-ground communication channel without impacting the situational awareness of the ground station 220. The interval may then be increased as the aircraft approaches the weather to maintain the situational awareness.

In embodiments, the interval 310 may be changed based on changes in intensity of the weather cell data 312. For example, the interval 310 may be increased when the intensity of the weather cells increases and/or may be decreased when the intensity of the weather cells decreases. In some instances, the memory 210 may include one or more thresholds. The interval 310 may be increased when an intensity of the weather cells is above the threshold and decreased when the intensity is below the threshold. The communication system 208 may then transmit the weather data 302 based on the intensity of the weather cell data 312.

In embodiments, the interval 310 may be changed in response the processors 204 detecting a new weather cell in the weather data 302. For example, the interval 310 may be increased when new weather cells are detected. The processors 204 may detect the new weather cell using a cell-track algorithm. The new weather cell may be detected and stored with a unique ID. The communication system 208 may transmit the weather data 302 more frequently when the new weather cells are detected. The new weather cells detected may be indicative of weather cells which have recently developed or which were otherwise not detected in the previous weather data. The interval 310 may be increased to provide the ground station 220 with situational awareness of the new weather cell.

In embodiments, the interval 310 may be changed based on the link data 314. The link data 314 may indicate one or more wireless transmission characteristics of the air-to-ground communication links (e.g., satellite communication (SATCOM) link 222, a very-high frequency (VHF) link 224, a high-frequency (HF) link 232, and the like). For example, the link data 314 may indicate an availability, a bandwidth, a cost, link utilization, jitter, latency, retransmission, and the like for the air-to-ground communication links. The processors 204 may monitor the various wireless transmission characteristics and detect changes in the wireless transmission characteristics. The processors 204 may then change the interval 310 in response to detecting a change in one or more of the wireless transmission characteristics.

The bandwidth may indicate the maximum data transfer rate. In some instances, the VHF link 224 may include a higher bandwidth than the SATCOM link 222 and/or the HF link 232. The processors 204 may change the interval 310 to transmit more frequently over the VHF link 224 and less frequently over the SATCOM link 222 and/or the HF link 232. The program instructions 306 may cause the processors 204 to cause the communication system 208 to increase the transmission of the weather data 302 from a first interval to a second interval in response detecting a change in a bandwidth of the communication system 150 and/or in response to detecting the VHF link 224 is unavailable.

The air-to-ground communication links may each include costs associated with the links. The SATCOM link 222 may incur one or more costs (e.g., a price per kilobyte of data). The type of the SATCOM link 222 may also impact the costs. For example, different constellations may include different costs. The HF link 232 and the VHF link 224 may be free. The processors 204 may change the interval 310 based on a cost of the SATCOM link 222. For example, the processors 204 may change the interval 310 depending upon the availability of each of the SATCOM constellations.

The link data 314 may also include a communication media status representing the link utilization. The link utilization may include retransmission, side traffic, signal strength, and the like. In embodiments, the processors 204 may change the interval 310 based on the link utilization. For example, the processors 204 may detect a change in the retransmission, the side traffic, and/or the signal strength and update the interval 310 in response to detecting the change.

Figure 4:
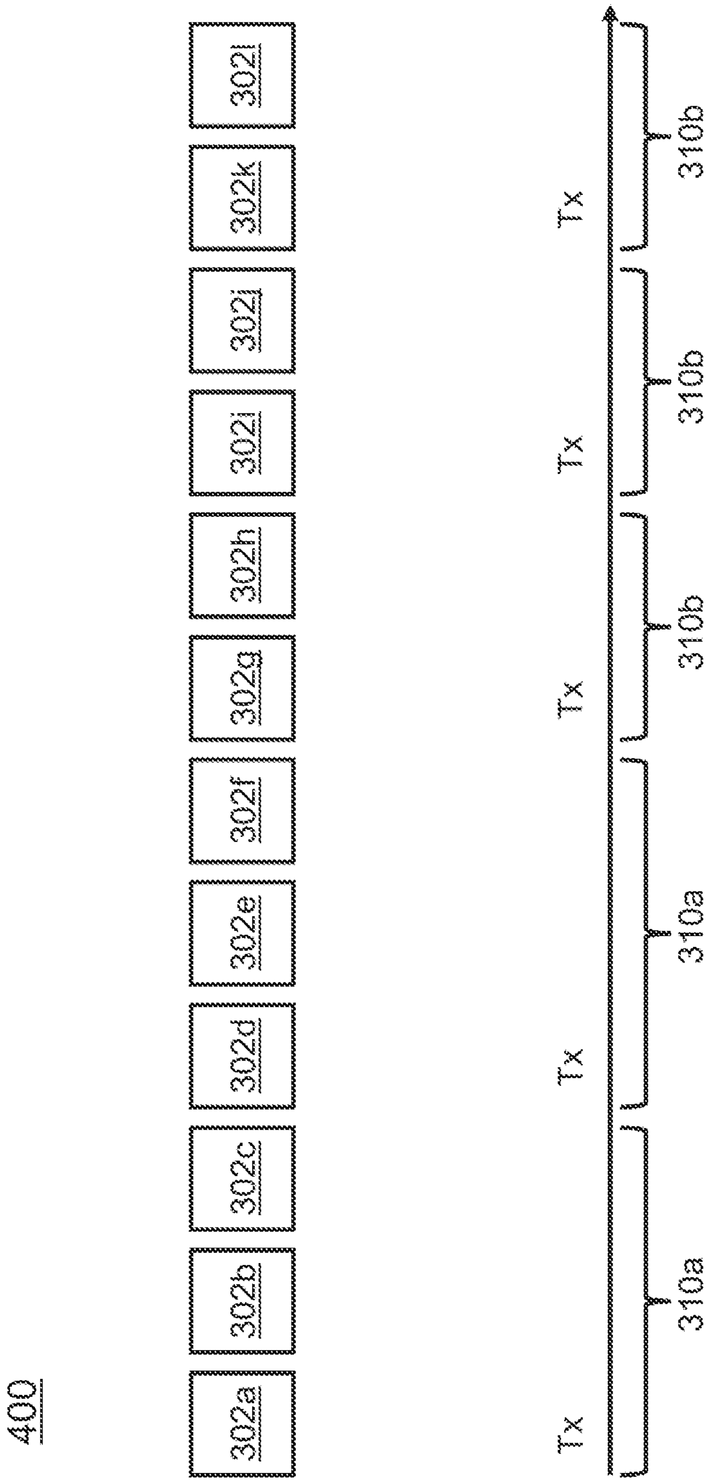
FIG. 4 depicts a timing diagram of a method, in accordance with one or more embodiments of the present disclosure.

Referring now to FIG. 4, a method 400 is described, in accordance with one or more embodiments of the present disclosure. The method 400 may be a method for smart air-to-ground data transmission optimization. The embodiments and the enabling technology described previously herein in the context of the aircraft 100 should be interpreted to extend to the method 400. For example, the program instructions 306 may cause the processors 204 to implement the method 400.

The method 400 may include scanning, by the weather radar system 150, for the sets of weather data 302 (e.g., weather data 302*a*-3021). The weather radar system 150 may scan at a sampling rate, such as, but not limited to, every four seconds. The weather radar system 150 may continue to scan at the sampling rate regardless of the interval 310 at which the weather data 302 is transmitted from the aircraft 100.

The method 400 may include wirelessly transmitting (Tx), by the communication system 208, one or more of the sets of weather data 302 from the aircraft at the interval 310 (e.g., interval 310*a*, interval 310*b*). For example, the interval 310*a* is depicted as being three times the sampling rate of the weather data 302 or every twelve seconds, although this is not intended to be limiting. In this regard, one of the three sets of weather data may be transmitted during the interval 310*a*. By way of another example, the interval 310*b* is depicted as being the two times the sampling rate of the weather data 302 or every eight seconds, although this is not intended to be limiting. In this regard, one of the two sets of weather data may be transmitted during the interval 310*b*. In this example described, the interval 310*b* is faster (e.g., 1.5 times faster) than the interval 310*a*, although this is not intended to be limiting.

The method 400 may include changing the wireless transmission of the weather data 302 from the interval 310*a* to interval 310*b*. The interval 310 may be changed for any of the various factors previously described, such as, but not limited to, motion of the aircraft 100, characteristics of the weather cell data 312, link data 314 regarding the air-to-ground links, and the like.

Referring generally again to FIGS. 1A-4. In embodiments, the weather data 302 may be aggregated and/or compressed before transmission from the aircraft 100. Aggregating and/or compressing the weather data may optimize bandwidth utilization, transfer cost, and/or transfer time of the air-to-ground communication links. For example, several sets of the weather data (e.g., sets from every four seconds) may be aggregated together.

Although much of the present disclosure is directed to the communication system 208 transmitting the weather data 302 from the aircraft 100 at the interval 310 by the air-to-ground communication channel, this is not intended as a limitation of the present disclosure. In embodiments, the communication system 208 may transmit the weather data 302 at the interval 310 to one or more devices within the aircraft 100, such as, but not limited to, an electronic flight bag (EFB) or the like.

The methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system comprising:

a memory maintaining program instructions; and one or more processors configured to execute the program instructions causing the one or more processors to:

receive weather data from a weather radar system onboard an aircraft, wherein the weather data is associated with a plurality of radar returns;

cause a communication system to wirelessly transmit the weather data at a first interval from the aircraft; and cause the communication system to increase the wireless transmission of the weather data from the first interval to a second interval; wherein the second interval is faster than the first interval; wherein the program instructions cause the one or more processors to increase the wireless transmission of the weather data from the first interval to the second interval in response to the one or more processors detecting an expected change of at least one of a yaw or a pitch of the aircraft.

2. The system of claim 1, wherein the program instructions cause the one or more processors to detect an actual change in the at least one of a yaw or a pitch of the aircraft based on position data from one or more sensors.

3. The system of claim 1, wherein the program instructions cause the one or more processors to compare a current position of the aircraft with a flight plan of the aircraft to detect the expected change in the at least one of a yaw or a pitch of the aircraft.

4. The system of claim 1, wherein the program instructions cause the one or more processors to detect and track one or more weather cells in the weather data.

5. The system of claim 1, wherein the communication system is configured to wirelessly transmit the weather data from the aircraft by a wireless link.

6. The system of claim 5, wherein the wireless link comprises one of a satellite communication link, a high frequency link, or a very high frequency link.

7. The system of claim 5, wherein the program instructions cause the one or more processors to cause the communication system to increase the wireless transmission of the weather data from the first interval to the second interval in response to the one or more processors detecting a change in a wireless transmission characteristic of the communication system.

8. The system of claim 7, wherein the wireless transmission characteristic comprises one of bandwidth, jitter, latency, link utilization, or retransmission.

9. The system of claim 5, wherein the program instructions cause the one or more processors to cause the communication system to increase the wireless transmission of the weather data from the first interval to the second interval in response to the one or more processors detecting the wireless link is unavailable.

10. The system of claim 1, wherein the weather data comprises at least one of rho-theta data or raster data.

11. The system of claim 1, wherein the weather data comprises a height, a centroid, and a weather condition of one or more weather cells.

12. The system of claim 11, wherein the weather condition comprises one of a probability of lightning or a probability of hail.

13. The system of claim 1, wherein the program instructions cause the one or more processors to cause the communication system to decrease the wireless transmission of the weather data from the second interval to the first interval.

14. The system of claim 4, wherein the one or more processors increase the wireless transmission of the weather data in response to the one or more processors detecting the expected change of at least one of the yaw or the pitch of the aircraft without first detecting the one or more weather cells in the weather data.

15. An aircraft comprising:

a weather radar system configured to generate weather data at a sampling rate, wherein the weather data is associated with a plurality of radar returns;

a flight display configured to generate a weather radar overlay based on the weather data;

a communication system configured to wirelessly transmit the weather data from the aircraft;

a memory maintaining program instructions; and one or more processors configured to execute the program instructions causing the one or more processors to:

receive the weather data from the weather radar system;

cause the communication system to wirelessly transmit the weather data at a first interval from the aircraft; and cause the communication system to increase the wireless transmission of the weather data from the first interval to a second interval; wherein the second interval is faster than the first interval; wherein the program instructions cause the one or more processors to increase the wireless transmission of the weather data from the first interval to the second interval in response to the one or more processors detecting an expected change of at least one of a yaw or a pitch of the aircraft.

* * * * *